United States Patent
Wu et al.

(10) Patent No.: US 12,454,182 B2
(45) Date of Patent: Oct. 28, 2025

(54) METHOD AND APPARATUS FOR VEHICLE CONTROL, STORAGE MEDIUM, ELECTRONIC DEVICE, AND COMPUTER PROGRAM

(71) Applicant: GREAT WALL MOTOR COMPANY LIMITED, Hebei (CN)

(72) Inventors: Di Wu, Hebei (CN); Xuejing Yang, Hebei (CN); Jun Zhang, Hebei (CN); Han Liu, Hebei (CN); Song Han, Hebei (CN); Zengli Wang, Hebei (CN); Hongyan Shan, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 273 days.

(21) Appl. No.: 18/024,116

(22) PCT Filed: Sep. 3, 2021

(86) PCT No.: PCT/CN2021/116477
§ 371 (c)(1),
(2) Date: Mar. 1, 2023

(87) PCT Pub. No.: WO2022/048643
PCT Pub. Date: Mar. 10, 2022

(65) Prior Publication Data
US 2023/0264574 A1 Aug. 24, 2023

(30) Foreign Application Priority Data
Sep. 3, 2020 (CN) .......................... 202010917831.0

(51) Int. Cl.
*G05D 1/00* (2024.01)
*B60L 7/18* (2006.01)

(52) U.S. Cl.
CPC .............. *B60L 7/18* (2013.01); *B60L 2240/16* (2013.01); *B60L 2240/70* (2013.01)

(58) Field of Classification Search
CPC ....................................................... B60L 7/18
See application file for complete search history.

(56) References Cited

U.S. PATENT DOCUMENTS 9,731,735 B1  8/2017 Nishinaga et al.
10,134,278 B1 * 11/2018 Konrardy ............... G08G 1/166
(Continued)

FOREIGN PATENT DOCUMENTS

CN  104691341 A  6/2015
CN  108058615 A  5/2018
(Continued)

OTHER PUBLICATIONS

International Search Report for PCT/CN2021/116477 mailed on Nov. 22, 2021.

*Primary Examiner* — Redhwan K Mawari
*Assistant Examiner* — Paul W Arellano
(74) *Attorney, Agent, or Firm* — Schmeiser, Olsen & Watts LLP (57) ABSTRACT

A method and an apparatus for vehicle control, a storage medium, an electronic device, and a computer program are provided. The method is applicable to a vehicle and includes: acquiring a target deceleration, if the vehicle is traveling on a road section; and performing the braking energy recovery according to the target deceleration, if the vehicle receives a brake instruction and triggers the braking energy recovery. For each vehicle of a plurality of vehicles, the target deceleration is determined by a plurality of history decelerations of each vehicle when traveling on the road section and triggering a braking energy recovery.

5 Claims, 7 Drawing Sheets

(56) References Cited

U.S. PATENT DOCUMENTS

| | | | |
|---|---|---|---|
| 10,743,280 B1* | 8/2020 | Lekutai | H04W 60/06 |
| 2009/0105942 A1 | 4/2009 | Lin et al. | |
| 2015/0120175 A1* | 4/2015 | Vahidi | G08G 1/0141 |
| | | | 701/119 |
| 2017/0088128 A1* | 3/2017 | Nakada | B60W 40/09 |
| 2017/0129488 A1* | 5/2017 | Noumura | B60W 10/18 |
| 2018/0072290 A1* | 3/2018 | Boethel | B60T 8/1708 |
| 2019/0263403 A1* | 8/2019 | Choi | B60W 30/146 |
| 2020/0079348 A1* | 3/2020 | Kim | B60W 30/18127 |

FOREIGN PATENT DOCUMENTS

| | | |
|---|---|---|
| CN | 108437849 A | 8/2018 |
| CN | 108909459 A | 11/2018 |
| CN | 108928238 A | 12/2018 |
| CN | 109471783 A | 3/2019 |
| CN | 109572439 A | 4/2019 |
| CN | 109795506 A | 5/2019 |
| CN | 110588656 A | 12/2019 |
| CN | 111231962 A | 6/2020 |
| CN | 111547035 A | 8/2020 |
| DE | 102011114481 A1 | 3/2013 |
| KR | 10-2019-0077516 A | 7/2019 |

* cited by examiner

FIG. 1

FIG. 2 acquiring a target deceleration, if the vehicle is traveling on a road section, wherein for each vehicle of a plurality of vehicles, the target deceleration is determined by a plurality of history decelerations of each vehicle when traveling on the road section and triggering a braking energy recovery; and ~S301 performing the braking energy recovery according to the target deceleration, if the vehicle receives a brake instruction and triggers the braking energy recovery ~S302

METHOD AND APPARATUS FOR VEHICLE CONTROL, STORAGE MEDIUM, ELECTRONIC DEVICE, AND COMPUTER PROGRAM

CROSS-REFERENCE TO RELATED APPLICATIONS

This application claims priority to PCT/CN2021/116477, having a filing date of Sep. 3, 2021, which is based on Chinese Patent Application No. 202010917831.0, having a filing date of Sep. 3, 2020, the entire contents both of which are hereby incorporated by reference.

FIELD OF TECHNOLOGY

The following relates to the field of vehicle automatic control, and more particularly to a method and an apparatus for vehicle control, a storage medium, an electronic device, and a computer program.

BACKGROUND

In order to increase a cruising range of an electric vehicle or a hybrid vehicle, the vehicle can be equipped with an energy recovery function, which can effectively improve the energy utilization during the deceleration process, and which, during the deceleration process triggered by the driver's release of the accelerator pedal, can convert the kinetic energy into electrical energy for storage and use for driving. The coasting energy recovery is usually divided into three levels of recovery intensities, which can be adjusted manually. In case of different recovery intensities, the deceleration of the whole vehicle in the energy recovery process is also different.

For the purpose of improving security monitoring and user experience, more and more vehicles have incorporated the vehicle networking function. By arranging a vehicle networking module in the vehicle to establish communication with a cloud platform or a mobile phone client, the user can interact with the vehicle through the mobile APP, such as viewing vehicle information and remotely controlling the vehicle, and moreover, the status of the vehicle can be analyzed online by the cloud platform based on the data uploaded from the vehicle, and a warning can be triggered timely when the malfunction of the vehicle occurs.

SUMMARY

An aspect relates to a method and an apparatus for vehicle control, an electronic device, and a computer program. In an embodiment, the method and apparatus are automatically adapted to the requirement of the real-time road condition for performing the braking energy recovery.

To achieve the above aspect, the present application provides a method for vehicle control, being applied to a vehicle. In an embodiment, the method includes:

acquiring a target deceleration, if the vehicle is traveling on a road section, in which, for each vehicle of a plurality of vehicles, the target deceleration is determined by a plurality of history decelerations of each vehicle when traveling on the road section and triggering a braking energy recovery; and performing the braking energy recovery according to the target deceleration, if the vehicle receives a brake instruction and triggers the braking energy recovery.

In some embodiments, the step of acquiring the target deceleration includes:

receiving the target deceleration sent from a server. For each vehicle of the plurality of vehicles, the server respectively acquires the plurality of history decelerations of each vehicle when traveling on the road section and triggering the braking energy recovery, and determines the target deceleration according to the plurality of history decelerations.

In some embodiments, the step of acquiring the target deceleration includes:

for each vehicle of the plurality of vehicles, acquiring, from the server, the plurality of history decelerations of each vehicle when traveling on the road section and triggering the braking energy recovery, and determining the target deceleration according to the plurality of history decelerations.

In some embodiments, the step of determining the target deceleration according to the plurality of history decelerations includes:

for each of the plurality of vehicles, performing weighted summation on the plurality of historical decelerations to obtain the first deceleration of each of the plurality of vehicles; and determining the target deceleration according to the first deceleration of each of the plurality of vehicles.

In some embodiments, the step of determining the target deceleration according to the first deceleration of each of the plurality of vehicles includes:

performing weighted summation on the first deceleration of each of the plurality of vehicles, to obtain the target deceleration.

In some embodiments, the step of determining the target deceleration according to the first deceleration of each of the plurality of vehicles includes:

performing weighted summation on the first deceleration of each of the plurality of vehicles, whereby obtaining a second deceleration;

determining a predetermined maximum deceleration as the target deceleration, if the second deceleration is greater than or equal to the predetermined maximum deceleration;

determining a predetermined minimum deceleration as the target deceleration, if the second deceleration is smaller than or equal to the predetermined minimum deceleration; and determining the second deceleration as the target deceleration, if the second deceleration is greater than the predetermined minimum deceleration and smaller than the predetermined maximum deceleration. The predetermined maximum deceleration is greater than the predetermined minimum deceleration.

In some embodiments, when performing the weighted summation on the plurality of historical decelerations, the closer a time when a historical deceleration occurs is to a current time, the greater a weight of the historical deceleration is. When performing weighted summation on the first deceleration of each of the plurality of vehicles, the closer the time when a vehicle is traveling on the road section is to the current time, the greater the weight of the first deceleration of the vehicle is.

The present application further provides a method for vehicle control, being applied to a server. In an embodiment, the method includes:

for each vehicle of a plurality of vehicles, acquiring a plurality of history decelerations of each vehicle when traveling on the road section and triggering a braking energy recovery;

determining the target deceleration according to the plurality of history decelerations; and sending the target deceleration to a vehicle traveling on the road section, to enable the vehicle receiving the target deceleration to perform braking energy recovery according to the target deceleration when the vehicle receives a brake instruction and triggers the braking energy recovery.

In some embodiments, the step of determining the target deceleration according to the plurality of history decelerations includes:

for each of the plurality of vehicles, performing weighted summation on the plurality of historical decelerations to obtain the first deceleration of each of the plurality of vehicles; and determining the target deceleration according to the first deceleration of each of the plurality of vehicles.

In some embodiments, the step of determining the target deceleration according to the first deceleration of each of the plurality of vehicles includes:

performing weighted summation on the first deceleration of each of the plurality of vehicles, to obtain the target deceleration.

In some embodiments, the step of determining the target deceleration according to the first deceleration of each of the plurality of vehicles includes:

performing weighted summation on the first deceleration of each of the plurality of vehicles, whereby obtaining a second deceleration;

determining a predetermined maximum deceleration as the target deceleration, if the second deceleration is greater than or equal to the predetermined maximum deceleration;

determining a predetermined minimum deceleration as the target deceleration, if the second deceleration is smaller than or equal to the predetermined minimum deceleration; and determining the second deceleration as the target deceleration, if the second deceleration is greater than the predetermined minimum deceleration and smaller than the predetermined maximum deceleration. The predetermined maximum deceleration is greater than the predetermined minimum deceleration.

In some embodiments, when performing the weighted summation on the plurality of historical decelerations, the closer a time when a historical deceleration occurs is to a current time, the greater a weight of the historical deceleration is. When performing weighted summation on the first deceleration of each of the plurality of vehicles, the closer the time when a vehicle is traveling on the road section is to the current time, the greater the weight of the first deceleration of the vehicle is.

The present application further provides an apparatus for vehicle control, being applied to a vehicle. The apparatus includes:

a first acquisition module, configured for acquiring a target deceleration, if the vehicle is traveling on a road section; in which, for each vehicle of a plurality of vehicles, the target deceleration is determined by a plurality of history decelerations of each vehicle when traveling on the road section and triggering a braking energy recovery; and a control module, configured for performing the braking energy recovery according to the target deceleration, if the vehicle receives a brake instruction and triggers the braking energy recovery.

The present application further provides an apparatus for vehicle control, being applied to a server. The apparatus includes:

a second acquisition moule, configured for acquiring a plurality of history decelerations of each vehicle of a plurality of vehicles when traveling on the road section and triggering a braking energy recovery;

a determination module, configured for determining the target deceleration according to the plurality of history decelerations; and a sending module, configured for sending the target deceleration to a vehicle traveling on the road section, to enable the vehicle receiving the target deceleration to perform braking energy recovery according to the target deceleration when the vehicle receives a brake instruction and triggers the braking energy recovery.

The present application further provides a computer-readable storage medium, storing a computer program, which, when being executed by a processor, causes the processor to perform steps of the above method.

An electronic device, including:

a memory, storing a computer program; and a processor, configured to execute the computer program in the memory, so as to perform steps of the above method.

A computer program, including computer readable codes, which, when running on a computing processing device, causes the computing processing device to perform the above method for vehicle control.

Based on the above technical solution, the target deceleration is determined by the historical decelerations of a plurality of vehicles when traveling on the road section and triggering the braking energy recovery, and the vehicle is controlled to perform braking energy recovery according to the target deceleration when the current vehicle is driven on the road section. In this way, the braking recovery intensity suitable for the road section where the current vehicle is located can be applied, and the braking recovery can be performed economically, thereby reducing the number of times of stepping on the brake pedal and improving the driving experience.

Other features and advantages of the present application will be described in detail in the detailed description of the embodiments hereinbelow.

BRIEF DESCRIPTION

Some of the embodiments will be described in detail, with references to the following Figures, wherein like designations denote like members, wherein.

DETAILED DESCRIPTION

Specific embodiments of the present application will be described in detail hereinbelow in conjunction with the accompanying drawings. It should be understood that the specific implementations described here are only used to illustrate and explain the present application, not to limit the present application.

Figure 1:
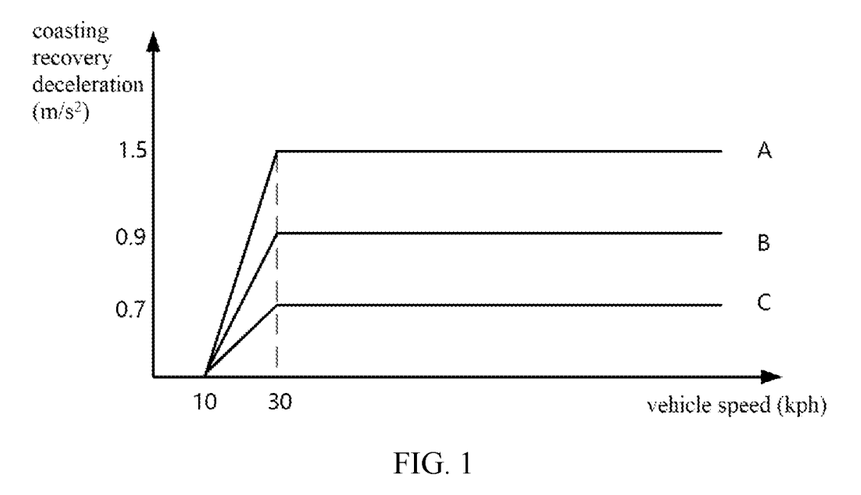
FIG. 1 is a curve schematic diagram showing three-level recovery intensities in a braking energy recovery strategy in the existing technology.

FIG. 1 is a curve schematic diagram showing three-level recovery intensities in a braking energy recovery strategy in the existing technology. As shown in FIG. 1, three levels of recovery intensities are provided under the braking energy recovery function, which are determined by curves A, B, and C, respectively, from strong to weak. When one of the levels is selected, the vehicle is controlled to decelerate according to a fixed recovery deceleration curve, being unable to be combined with a surrounding road conditions, and the degree of intelligence is not high.

For example, when a user has a deceleration demand of 1.2 m/s$^2$, but the vehicle is currently in the level B of the recovery intensity levels, then the electric brake can only produce a deceleration of 0.9 m/s$^2$, and the user has to step on the brake pedal to supplement the insufficient deceleration, such a strategy has affected the economy of the vehicle and the comfort of the user. The inventor thinks that when the vehicle travels on a road section, the historical decelerations of the vehicle based on a certain road section can be correlated, and the data processing can be performed online based on a vehicle networking module and a cloud platform, to perform the adaptive adjustment of the coasting energy recovery intensity (deceleration), in this way, the defects of the original manual three-level adjustment with fixed energy recovery intensity can be overcome, and the frequency of use of the brake pedal can be reduced when the driver needs to decelerate (release the accelerator pedal).

Figure 2:
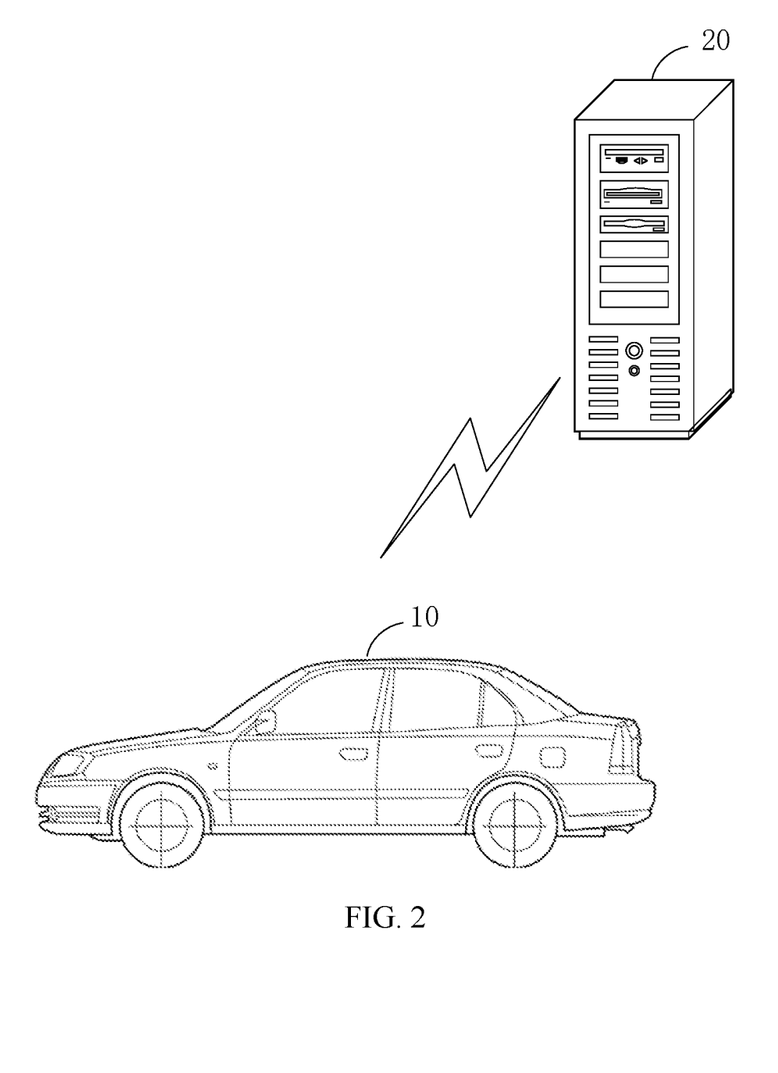
FIG. 2 is a schematic diagram of a vehicle control method provided by an exemplary embodiment.

FIG. 2 is a schematic diagram of a vehicle control method provided by an exemplary embodiment. As shown in FIG. 2, communication between a vehicle 10 and a server 20 can be established through a wireless network. Communication between the server 20 and a plurality of vehicles can also be established through the wireless network. The server 20 may be a vehicle networking server, and the vehicle 10 may communicate with the server 20 through a vehicle T-box installed therein.

For example, the server 20 may include the following five modules:

1) Data Analysis Module

The controllers of the vehicle communicate in the form of controller area network (CAN) messages, and the data uploaded by the vehicle to the server needs to be converted into a form that can be calculated. This process is referred to as data analysis.

2) Data Cleaning Module

The vehicle continues uploading data to the server in the wake-up state. When using the vehicle normally, the non-driving actions, such as opening and closing the door, remote query of vehicle status, and the like, will also wake up the vehicle, and the vehicle will upload a lot of invalid data. Thus, the data needs to be cleaned, that is, the invalid data are removed and the valid data are retained.

3) Database

The cleaned data are uniformly stored in the database, where the data are sorted based on time and location, so that the data calculation module can call the data in particular time and location segment.

4) Data Operation Module

A most economical and safest energy recovery intensity (deceleration) for the particular road condition can be determined based on a predetermined algorithm.

5) Data Conversion Module

Contrary to the function of the data analysis module, the operation result of the data operation module is converted into a CAN message and sent to the vehicle end.

The vehicle networking (T-box) module is arranged in the vehicle and communicate with the server via a network connection protocol. The vehicle networking module mainly includes the following two functions:

Data routing: as an intermediate link of information exchange between the electronic control unit (ECU) in the vehicle and the server, the data routing performs conversion between in-vehicle communication and long-distance communication protocols.

Data storage: A storage module is added to the vehicle networking module. When the vehicle fails to establish communication with the server, the vehicle running data are stored firstly in the storage module, and the whole package is uploaded after the communication is re-established.

Figure 3:
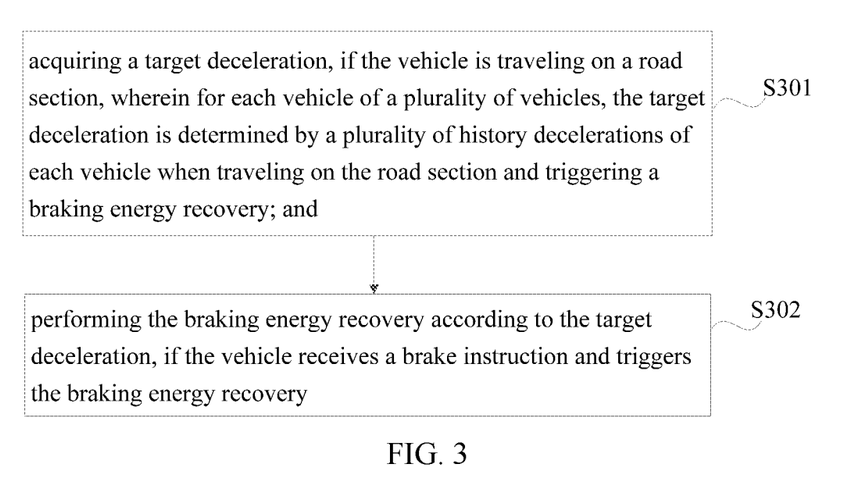
FIG. 3 is a flowchart of a vehicle control method applied to a vehicle provided by an exemplary embodiment.

FIG. 3 is a flowchart of a vehicle control method being applied to a vehicle according to exemplary embodiment of the present application. As shown in FIG. 3, the method may include the following steps:

In step S301, if the vehicle is traveling on a road section, a target deceleration is acquired. For each vehicle of a plurality of vehicles, the target deceleration is determined by a plurality of history decelerations of each vehicle when traveling on the road section and triggering a braking energy recovery.

In step S302, if the vehicle receives a brake instruction and triggers the braking energy recovery, the vehicle is controlled to perform the braking energy recovery according to the target deceleration.

The server can communicate with the plurality of vehicles to obtain the decelerations sent from the plurality of vehicles. The decelerations are decelerations of vehicles when traveling on the road section and triggering the braking energy recovery. The server may associate a deceleration with a road section where a certain vehicle is located as a historical deceleration corresponding to the road section and the vehicle, and store such relevance data.

The plurality of vehicles may be vehicles that have traveled on the road section before the current vehicle. The plurality of vehicles may or may not include the current vehicle.

The braking instruction refers to an instruction triggered by the driver of the current vehicle, for example, if the driver of the current vehicle depresses the brake pedal, the current vehicle receives the braking instruction.

Based on the above technical solution, the target deceleration is determined by the historical decelerations of a plurality of vehicles when traveling on the road section and triggering the braking energy recovery, and the vehicle is controlled to perform braking energy recovery according to the target deceleration when the vehicle is travelling on the road section. In this way, the braking recovery intensity suitable for the road section where the current vehicle is located can be applied, and the braking recovery can be performed economically, thereby reducing the number of times of stepping on the brake pedal and improving the driving experience.

In an embodiment, the acquiring the target deceleration in step S301 comprises:

receiving the target deceleration sent from a server. For each vehicle of the plurality of vehicles, the server respectively acquires the plurality of history decelerations of each vehicle when traveling on the road section and triggering the braking energy recovery, and determines the target deceleration according to the plurality of history decelerations.

In this embodiment, the server can determine the target deceleration according to plurality of historical decelerations, and then send the determined target deceleration to the current vehicle. In this way, the current vehicle does not need to receive a large amount of historical deceleration data. The amount of data communicated between the vehicle and the server is relatively small.

In another embodiment, the acquiring the target deceleration in step S301 comprises:

for each vehicle of the plurality of vehicles, acquiring, from the server, the plurality of history decelerations of each vehicle when traveling on the road section and triggering the braking energy recovery, and determining the target deceleration according to the plurality of history decelerations.

In this embodiment, the server can send the historical decelerations of the plurality of vehicles traveling on the road section and triggering the braking energy recovery to the current vehicle, and the current vehicle determines the target deceleration according to the historical decelerations. In this way, the server does not need to calculate the target deceleration, and the amount of data processing is relatively small.

In another embodiment, the step of determining the target deceleration according to the plurality of history decelerations comprises: for each of the plurality of vehicles, performing weighted summation on the plurality of historical decelerations to obtain the first deceleration of each of the plurality of vehicles; and determining the target deceleration according to the first deceleration of each of the plurality of vehicles.

The deceleration of the vehicle can be calculated by $(V_2-V_1)/t$, in which, $V_2$ and $V_1$ are a final speed and an initial speed of the vehicle deceleration, respectively, and t is the duration of the vehicle deceleration.

The vehicle can send a real-time vehicle speed to the server, and the server can calculate the deceleration of the vehicle, or alternatively, the vehicle can directly send a calculated deceleration to the server.

The first deceleration of each vehicle can be calculated according to the following formula:

$$a_1=M_1 \times a_{11}+M_2 \times a_{12}+ \ldots +M_n \times a_{1n}$$

$$a_2=M_1 \times a_{21}+M_2 \times a_{22}+ \ldots +M_n \times a_{2n}$$

$$a_3=M_1 \times a_{31}+M_2 \times a_{32}+ \ldots +M_n \times a_{3n} \ldots$$

$$\ldots$$

$$a_S=M_1 \times a_{S1}+M_2 \times a_{S2}+ \ldots +M_n \times a_{Sn}$$

$$M_1+M_2+ \ldots +M_n=1$$

In the above formulas, $a_i$ is the first deceleration of an i-th vehicle, S represents the number of vehicles, and $a_{i1}$, $a_{i2}$, $\ldots$, and $a_{in}$ represent the historical deceleration of the i-th vehicle. $M_1$, $M_2$, $\ldots$, and $M_n$ represent the weights of the historical decelerations of the i-th vehicle.

In addition, when performing weighted summation on the plurality of historical decelerations, the closer a historical deceleration occurs to the current time, the greater the weight is. That is, if the time points when the historical decelerations represented by $a_{i1}$, $a_{i2}$, $\ldots$, and $a_{in}$ happen are respectively from near to far from the current time, then the relationship between the weights can be: $M_1>M_2> \ldots >M_n$. Since the historical deceleration with a time point more closer to the current time, the greater the reference value of the historical deceleration is, such weight relationship is more closer to the actual situation of the current road section, making the target deceleration more accurate.

The first deceleration of each vehicle represents the deceleration of each vehicle when braking energy is recovered in the current road section. Considering the first deceleration of each vehicle in the road section, it is possible to more accurately and comprehensively determine the overall situation of the deceleration of most vehicles in the road section when braking energy is recovered.

In another embodiment, the step of determining the target deceleration according to the plurality of history decelerations comprises:

performing weighted summation on the first deceleration of each of the plurality of vehicles, to obtain the target deceleration.

Specifically, the target deceleration can be calculated according to the following formula:

$$a=K_1 \times a_1+K_2 \times a_2+ \ldots +K_S \times a_S$$

$$K_1+K_2+ \ldots +K_S=1$$

In the above formulas, a is the target deceleration, $a_i$ is the first deceleration of the i-th vehicle, and $K_1$, $K_2$, $\ldots$, and $K_S$ represent the weights of the first decelerations from the 1st vehicle to the S-th vehicle respectively.

In this embodiment, the target deceleration is obtained by weighted summation of the plurality of first decelerations of the plurality of vehicles, so that the determined target deceleration of the current vehicle is better suited to the braking recovery intensity on the road section where the current vehicle is located.

In addition, when performing weighted summation on the first deceleration of each of the plurality of vehicles, the closer the time when a vehicle is traveling on the road section is to the current time, the greater the weight of the first deceleration of the vehicle is. That is, if the time points when the first decelerations represented by $a_1$, $a_2$, $\ldots$, and $a_S$ of the vehicles traveling on the road section occur are respectively from near to far from the current time, the magnitude relationship between the weights can be: $K_1>K_2> \ldots >K_S$. Since the historical deceleration with a time point more closer to the current time, the greater the reference value of the historical deceleration is, such weight relationship is more closer to the actual situation of the current road section, making the target deceleration more accurate.

In another embodiment, a reasonable range can also be set for a final applied target deceleration. In this embodiment, the step of determining the target deceleration according to the plurality of history decelerations comprises:

performing weighted summation on the first deceleration of each of the plurality of vehicles, whereby obtaining a second deceleration; and determining a predetermined maximum deceleration as the target deceleration, if the second deceleration is greater than or equal to the predetermined maximum deceleration;

determining a predetermined minimum deceleration as the target deceleration, if the second deceleration is smaller than or equal to the predetermined minimum deceleration; and determining the second deceleration as the target deceleration, if the second deceleration is greater than the predetermined minimum deceleration and smaller than the predetermined maximum deceleration. The predetermined maximum deceleration is greater than the predetermined minimum deceleration.

Figure 4:
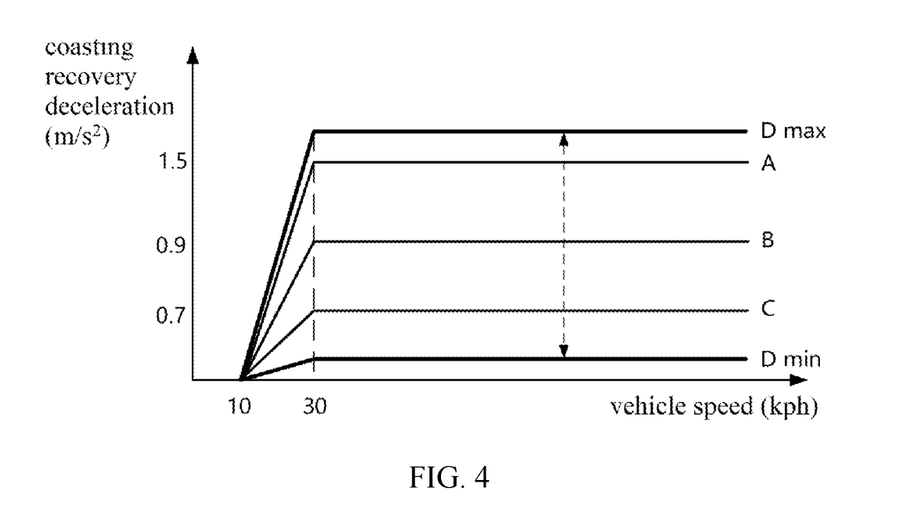
FIG. 4 is a curve schematic diagram showing a maximum and a minimum recovery intensity in a braking energy recovery strategy provided by an exemplary embodiment.

That is, when calculating the target deceleration, it is necessary to consider the deceleration adjustment range under the adaptive recovery intensity, and to control the deceleration value during the deceleration process to be within the range. FIG. 4 is a curve schematic diagram showing a maximum and a minimum recovery intensity in a braking energy recovery strategy provided by an exemplary embodiment. As shown in FIG. 4, when the vehicle speed is fixed, the deceleration corresponding to the curve Dmax is greater than the deceleration corresponding to the curve A, and the deceleration corresponding to the curve Dmin is smaller than the deceleration corresponding to the curve C. The deceleration corresponding to the curve Dmax may be the above-mentioned maximum deceleration, and the deceleration corresponding to the curve Dmin may be the above-mentioned minimum deceleration.

The above-mentioned maximum deceleration and minimum deceleration can be obtained and stored in advance according to experiments or experience. In this embodiment, the target deceleration is limited within a certain range, so as to avoid the situation that the determined target deceleration is unreasonable due to the deviation of historical data.

Figure 5:
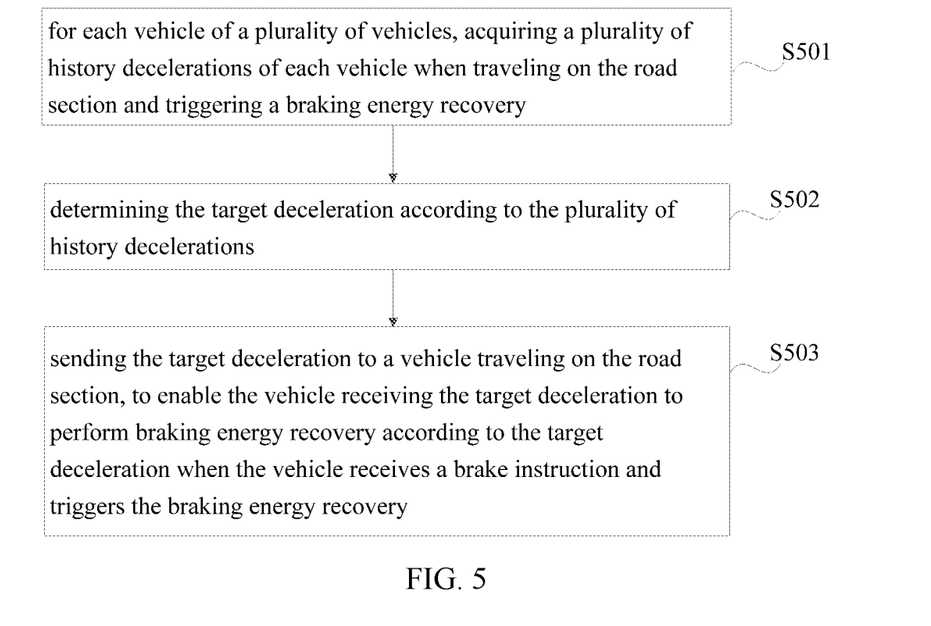
FIG. 5 is a flowchart of a vehicle control method applied to a server provided by an exemplary embodiment.

The present application further provides a vehicle control method that is applicable to a server. FIG. 5 is a flowchart of a vehicle control method, being applied to a server, according to an exemplary embodiment of the present application. As shown in FIG. 5, the method comprises the following steps:

step S501, for each vehicle of a plurality of vehicles, acquiring a plurality of history decelerations of each vehicle when traveling on the road section and triggering a braking energy recovery;

step S502, determining the target deceleration according to the plurality of history decelerations; and step S503, sending the target deceleration to a vehicle traveling on the road section, to enable the vehicle receiving the target deceleration to perform braking energy recovery according to the target deceleration when the vehicle receives a brake instruction and triggers the braking energy recovery.

In an embodiment, the method applied to the server corresponds to the embodiment in which the server determines the target deceleration in the method applied to the vehicle in FIG. 3.

Based on the above technical solution, the target deceleration is determined by the historical decelerations of a plurality of vehicles when traveling on the road section and triggering the braking energy recovery, and the vehicle is controlled to perform braking energy recovery according to the target deceleration when the vehicle is travelling on the road section. In this way, the braking recovery intensity suitable for the road section where the current vehicle is located can be applied, and the braking recovery can be performed economically, thereby reducing the number of times of stepping on the brake pedal and improving the driving experience.

In an embodiment, the step of determining the target deceleration according to the plurality of history decelerations comprises:

for each of the plurality of vehicles, performing weighted summation on the plurality of historical decelerations to obtain the first deceleration of each of the plurality of vehicles; and determining the target deceleration according to the first deceleration of each of the plurality of vehicles.

In another embodiment, the step of determining the target deceleration according to the first deceleration of each of the plurality of vehicles comprises: performing weighted summation on the first deceleration of each of the plurality of vehicles, to obtain the target deceleration.

In still another embodiment, the step of determining the target deceleration according to the first deceleration of each of the plurality of vehicles comprises:

performing weighted summation on the first deceleration of each of the plurality of vehicles, whereby obtaining a second deceleration;

determining a predetermined maximum deceleration as the target deceleration, if the second deceleration is greater than or equal to the predetermined maximum deceleration;

determining a predetermined minimum deceleration as the target deceleration, if the second deceleration is smaller than or equal to the predetermined minimum deceleration; and determining the second deceleration as the target deceleration, if the second deceleration is greater than the predetermined minimum deceleration and smaller than the predetermined maximum deceleration.

The predetermined maximum deceleration is greater than the predetermined minimum deceleration.

In still another embodiment, when performing the weighted summation on the plurality of historical decelerations, the closer a time when a historical deceleration occurs is to a current time, the greater a weight of the historical deceleration is.

With regard to the method in the above embodiment applied to the server, the specific manner of implementation operations in each step has been described in detail in the embodiment of the method applied to the vehicle, and thus will not be described in detail herein.

Figure 6:
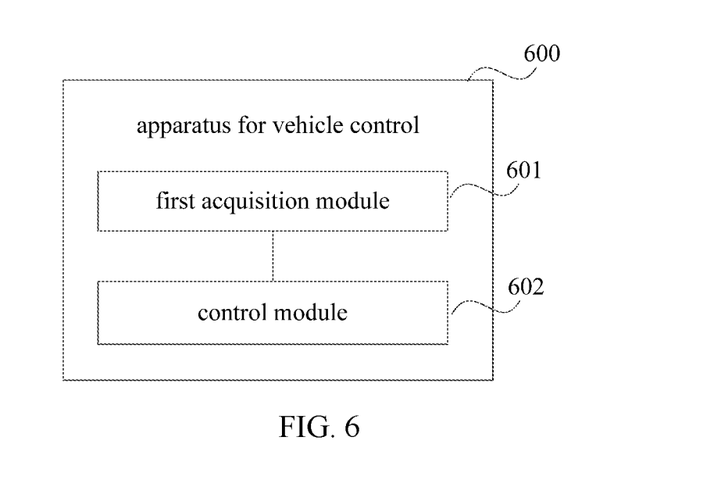
FIG. 6 is a block diagram of a vehicle control device applied to a vehicle provided by an exemplary embodiment.

The present application further provides an apparatus for vehicle control, being applied to a vehicle. FIG. 6 is a schematic block diagram of an apparatus for vehicle control, being applied to a vehicle according to an exemplary embodiment of the present application. As shown in FIG. 6, the apparatus 600 for vehicle control includes a first acquisition module 601 and a control module 602.

The first acquisition module 601 is configured for acquiring a target deceleration, if the vehicle is traveling on a road section; in which, for each vehicle of a plurality of vehicles, the target deceleration is determined by a plurality of history decelerations of each vehicle when traveling on the road section and triggering a braking energy recovery.

The control module is configured for performing the braking energy recovery according to the target deceleration, if the vehicle receives a brake instruction and triggers the braking energy recovery.

In some embodiments, the first acquisition module 601 includes an acquisition sub-module.

The acquisition sub-module is configured for receiving the target deceleration sent from a server. For each vehicle of the plurality of vehicles, the server respectively acquires the plurality of history decelerations of each vehicle when traveling on the road section and triggering the braking energy recovery, and determines the target deceleration according to the plurality of history decelerations.

In some embodiments, the first acquisition module 601 includes a second receiving sub-module and a first determination sub-module.

The second receiving sub-module is configured for acquiring, from the server, the plurality of history decelerations of each vehicle of the plurality of vehicles when traveling on the road section and triggering the braking energy recovery.

The first determination sub-module is configured for determining the target deceleration according to the plurality of history decelerations.

In some embodiments, the first determination sub-module includes a second determination sub-module and a third determination sub-module.

The second determination sub-module is configured for performing weighted summation on the plurality of historical decelerations, for each of the plurality of vehicles, to obtain the first deceleration of each of the plurality of vehicles.

The third determination sub-module is configured for determining the target deceleration according to the first deceleration of each of the plurality of vehicles.

In some embodiments, the third determination sub-module includes a fourth determination sub-module.

The fourth determination sub-module is configured for performing weighted summation on the first deceleration of each of the plurality of vehicles, to obtain the target deceleration.

In some embodiments, the third determination module include a fifth determination module, a sixth determination moule, a seventh determination module, and an eighth determination module.

The fifth determination moule is configured for performing weighted summation on the first deceleration of each of the plurality of vehicles, whereby obtaining a second deceleration.

The sixth determination moule is configured for determining a predetermined maximum deceleration as the target deceleration, if the second deceleration is greater than or equal to the predetermined maximum deceleration.

The seventh determination moule is configured for determining a predetermined minimum deceleration as the target deceleration, if the second deceleration is smaller than or equal to the predetermined minimum deceleration.

The eighth determination moule is configured for determining the second deceleration as the target deceleration, if the second deceleration is greater than the predetermined minimum deceleration and smaller than the predetermined maximum deceleration. The predetermined maximum deceleration is greater than the predetermined minimum deceleration.

In some embodiments, when performing the weighted summation on the plurality of historical decelerations, the closer a time when a historical deceleration occurs is to a current time, the greater a weight of the historical deceleration is. When performing weighted summation on the first deceleration of each of the plurality of vehicles, the closer the time when a vehicle is traveling on the road section is to the current time, the greater the weight of the first deceleration of the vehicle is.

Figure 7:
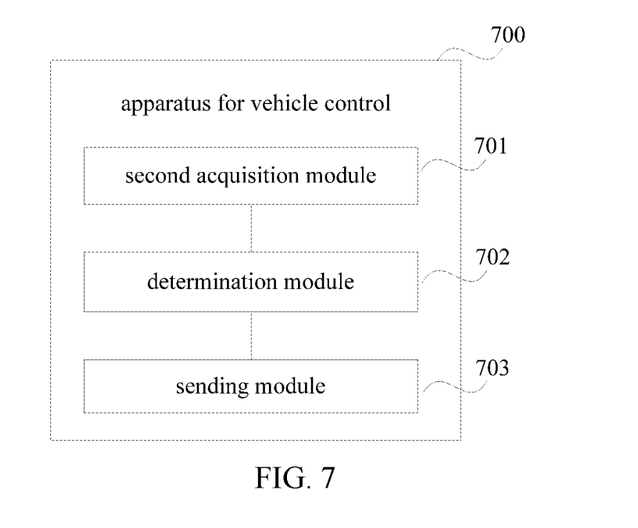
FIG. 7 is a block diagram of a vehicle control device applied to a server provided by an exemplary embodiment.

The present application further provides an apparatus for vehicle control, being applied to a server. FIG. 7 is a schematic block diagram of an apparatus for vehicle control, being applied to a server, according to an exemplary embodiment of the present application. As shown in FIG. 7, the apparatus 700 for vehicle control may include a second acquisition module 701, a determination module 702, and a sending module 703.

The determination module 702 is configured for acquiring a plurality of history decelerations of each vehicle of a plurality of vehicles when traveling on the road section and triggering a braking energy recovery.

The determination module 702 is configured for determining the target deceleration according to the plurality of history decelerations.

The sending module 703 is configured for sending the target deceleration to a vehicle traveling on the road section, to enable the vehicle receiving the target deceleration to perform braking energy recovery according to the target deceleration when the vehicle receives a brake instruction and triggers the braking energy recovery.

In some embodiments, the determination module 702 includes a nineth determination sub-module and a tenth determination sub-module.

The nineth determination sub-module is configured for performing weighted summation on the plurality of historical decelerations, for each of the plurality of vehicles, to obtain the first deceleration of each of the plurality of vehicles.

The tenth determination sub-module is configured for determining the target deceleration according to the first deceleration of each of the plurality of vehicles.

In some embodiments, the tenth determination sub-module includes an eleventh determination sub-module.

The eleventh determination sub-module is configured for performing weighted summation on the first deceleration of each of the plurality of vehicles, to obtain the target deceleration.

In some embodiments, the tenth determination sub-module includes a twelfth determination sub-module, a thirteenth determination sub-module, a fourteenth determination sub-module, and a fifteenth determination sub-module.

The twelfth determination sub-module is configured for performing weighted summation on the first deceleration of each of the plurality of vehicles, whereby obtaining a second deceleration.

The thirteenth determination sub-module is configured for determining a predetermined maximum deceleration as the target deceleration, if the second deceleration is greater than or equal to the predetermined maximum deceleration.

The fourteenth determination sub-module is configured for determining a predetermined minimum deceleration as the target deceleration, if the second deceleration is smaller than or equal to the predetermined minimum deceleration.

The fifteenth determination sub-module is configured for determining the second deceleration as the target deceleration, if the second deceleration is greater than the predetermined minimum deceleration and smaller than the predetermined maximum deceleration. The predetermined maximum deceleration is greater than the predetermined minimum deceleration.

In some embodiments, when performing the weighted summation on the plurality of historical decelerations, the closer a time when a historical deceleration occurs is to a current time, the greater a weight of the historical deceleration is.

For the above apparatus embodiments, the specific manners of performing operations by each module have been described in detail in the method embodiments, and will not be described in detail herein.

Based on the above technical solution, the target deceleration is determined by the historical decelerations of a plurality of vehicles when traveling on the road section and triggering the braking energy recovery, and the vehicle is controlled to perform braking energy recovery according to the target deceleration when the current vehicle is driven on the road section. In this way, the braking recovery intensity suitable for the road section where the current vehicle is located can be applied, and the braking recovery can be performed economically, thereby reducing the number of times of stepping on the brake pedal and improving the driving experience.

The present application further provides an electronic device, including a memory and a processor.

The memory stores a computer program. The processor is configured to execute the computer program in the memory, so as to perform steps of the above methods.

Figure 8:
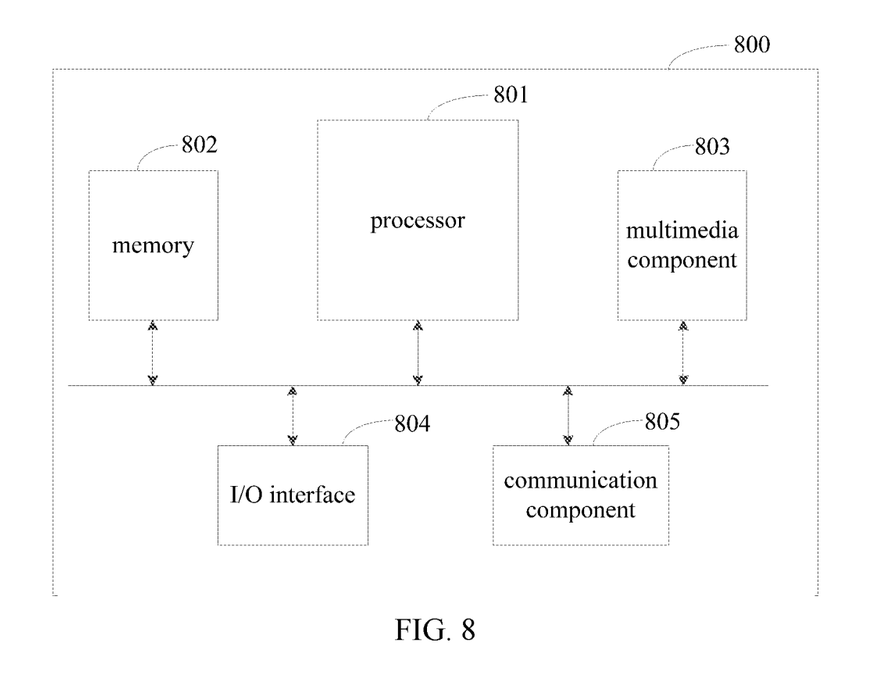
FIG. 8 is a block diagram of an electronic device shown in an exemplary embodiment.

FIG. 8 is a block diagram of an electronic device 800 according to an exemplary embodiment. As shown in FIG. 8, the electronic device 800 may include: a processor 801 and a memory 802. The electronic device 800 may also include one or more of a multimedia component 803, an input/output (I/O) interface 804, and a communication component 805.

The processor 801 is used to control the overall operation of the electronic device 800, so as to implement all or part of the steps in the above-mentioned method for vehicle control. The memory 802 is used to store various types of data to support the operation of the electronic device 800, for example, these data may include instructions for any application or method operating on the electronic device 800, and application-related data, Such as contact data, sent and received messages, pictures, audio, video, and the like. The memory 802 can be implemented by any type of volatile or non-volatile memory device or their combination, such as Static Random Access Memory (SRAM), Electrically Erasable Programmable Read-Only Memory (EEPROM), Erasable Programmable Read-Only Memory (EPROM), Programmable Read-Only Memory (PROM), read-only Memory (ROM), magnetic memory, flash memory, magnetic disk or optical disk. Multimedia components 803 may include screen and audio components. The screen can be, for example, a touch screen, and the audio component is used for outputting and/or inputting audio signals. For example, an audio component may include a microphone for receiving external audio signals. The received audio signal may be further stored in the memory 802 or sent through the communication component 805. The audio component also includes at least one speaker for outputting audio signals. The I/O interface 804 provides an interface between the processor 801 and other interface modules, which may be a keyboard, a mouse, buttons, and the like. These buttons can be virtual buttons or physical buttons. The communication component 805 is used for wired or wireless communication between the electronic device 800 and other devices. Wireless communication, such as Wi-Fi, Bluetooth, Near Field Communication (NFC), 2G, 3G, 4G, NB-IoT, eMTC, or other 5G, and the like, or any combinations thereof are not limited here. Therefore, the corresponding communication component 805 may include: a Wi-Fi module, a Bluetooth module, an NFC module and the like.

In an exemplary embodiment, the electronic device 800 may be implemented by one or more application-specific integrated circuits (ASIC), digital signal processors (DSP), digital signal processing equipment (Digital Signal Processing Device (DSPD), Programmable Logic Device (PLD), Field Programmable Gate Array (FPGA), controller, microcontroller, microprocessor or other electronic components, for executing the above-mentioned method for vehicle control.

In another exemplary embodiment, a computer-readable storage medium including a computer program instruction, which, when being executed by a processor, causes the processor to perform steps of the above vehicle control method. For example, the computer-readable storage medium may be the memory 802 storing the computer program instruction. The computer program instruction is executable by the processor 801 of the electronic device 800 to implement the above vehicle control method.

The present application further provides a computer program, including a computer readable codes, which, when running on a computing processing device, causes the computing processing device to perform the above vehicle control method.

Figure 9:
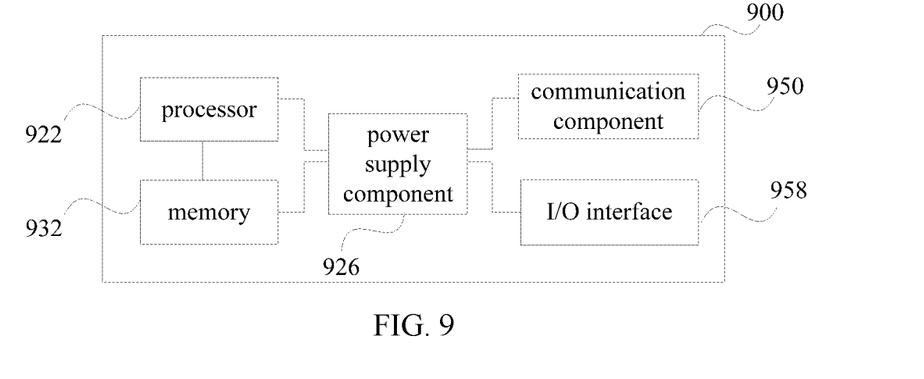
FIG. 9 is a block diagram of an electronic device shown in another exemplary embodiment.

FIG. 9 is a block diagram of an electronic device 900 according to an exemplary embodiment. For example, the electronic device 900 may be provided as a server. Referring to FIG. 9, an electronic device 900 includes a processor 922, the number of which may be one or more, and a memory 932 for storing computer programs executable by the processor 922. A computer program stored in memory 932 may include one or more modules each corresponding to a set of instructions. In addition, the processor 922 may be configured to execute the computer program to execute the above-mentioned method for vehicle control.

In addition, the electronic device 900 may further include a power supply component 926 and a communication component 950. The power supply component 926 may be configured to perform power management of the electronic device 900, and the communication component 950 may be configured to implement communication of the electronic device 900, for example, wired or wireless communication. In addition, the electronic device 900 may further include an input/output (I/O) interface 958. The electronic device 900 can operate based on an operating system stored in the memory 932, such as Windows Server™, Mac OS X™, Unix™, Linux™ and so on.

In another exemplary embodiment, a computer-readable storage medium including program instructions is also provided. The program instructions, when executed by a processor, causes the processor to implement the steps of the above-mentioned vehicle control method. For example, the computer-readable storage medium can be the above-mentioned memory 932 including program instructions, and the above-mentioned program instructions can be executed by the processor 922 of the electronic device 900, so as to implement the above-mentioned vehicle control method.

In another exemplary embodiment, a computer program product (non-transitory computer readable storage medium having instructions, which when executed by a processor, perform actions) is further provided. The computer program product comprises a computer program executable by a programmable device, and the computer program includes codes, which when executed by the programmable device, causes the programmable device to implement the above method for vehicle control.

The present application also provides a vehicle, including a braking energy recovery system and a controller, and the controller is configured to execute the steps of the above method provided by the present application.

The present application also provides a server, including a controller configured to execute the steps of the above method provided in the present application.

The preferred embodiments of the present application have been described in detail above in conjunction with the accompanying drawings. However, the present application is not limited to the specific details of the above embodiments. Within the scope of the technical concept of the present application, various simple modifications can be made to the technical solutions of the present application. These simple modifications all belong to the protection scope of the present application.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for vehicle control, being applied to a vehicle, the method comprising:
    acquiring a target deceleration, if the vehicle is traveling on a road section, wherein for each vehicle of a plurality of vehicles, the target deceleration is determined according to a plurality of history decelerations of each vehicle when traveling on the road section and triggering a braking energy recovery; and
    performing the braking energy recovery according to the target deceleration, if the vehicle receives a brake instruction and triggers the braking energy recovery;
    wherein the acquiring the target deceleration comprises:
    for each vehicle of the plurality of vehicles, acquiring, from a server, the plurality of history decelerations of each vehicle when traveling on the road section and triggering the braking energy recovery, and
    determining the target deceleration according to the plurality of history decelerations,
    wherein the determining the target deceleration according to the plurality of history decelerations comprises:
      for each of the plurality of vehicles, performing weighted summation on the plurality of historical decelerations to obtain a first deceleration of each of the plurality of vehicles; and
      determining the target deceleration according to the first deceleration of each of the plurality of vehicles,
      wherein the determining the target deceleration according to the first deceleration of each of the plurality of vehicles comprises:
        performing weighted summation on the first deceleration of each of the plurality of vehicles to obtain the target deceleration; or
        alternatively, performing weighted summation on the first deceleration of each of the plurality of vehicles to obtain a second deceleration; determining, if the second deceleration is greater than or equal to a predetermined maximum deceleration, the predetermined maximum deceleration as the target deceleration; determining, if the second deceleration is smaller than or equal to a predetermined minimum deceleration, the predetermined minimum deceleration as the target deceleration; and determining, if the second deceleration is greater than the predetermined minimum deceleration and smaller than the predetermined maximum deceleration, the second deceleration as the target deceleration, wherein the predetermined maximum deceleration is greater than the predetermined minimum deceleration.

2. The method of claim 1, wherein:
    when performing the weighted summation on the plurality of historical decelerations, the closer a time when a historical deceleration occurs is to a current time, the greater a weight of the historical deceleration is; and
    when performing weighted summation on the first deceleration of each of the plurality of vehicles, the closer the time when a vehicle is traveling on the road section is to the current time, the greater the weight of the first deceleration of the vehicle is.

3. A method for vehicle control, being applied to a server, the method comprising:
    for each vehicle of a plurality of vehicles, acquiring a plurality of history decelerations of each vehicle when traveling on the road section and triggering a braking energy recovery;
    determining a target deceleration according to the plurality of history decelerations; and
    sending the target deceleration to a vehicle traveling on the road section, to enable the vehicle receiving the target deceleration to perform braking energy recovery according to the target deceleration when the vehicle receives a brake instruction and triggers the braking energy recovery,
    wherein the determining the target deceleration according to the plurality of history decelerations comprises:
      for each of the plurality of vehicles, performing weighted summation on the plurality of historical decelerations to obtain a first deceleration of each of the plurality of vehicles; and
      determining the target deceleration according to the first deceleration of each of the plurality of vehicles;
      wherein the determining the target deceleration according to the first deceleration of each of the plurality of vehicles comprises:
        performing weighted summation on the first deceleration of each of the plurality of vehicles to obtain the target deceleration; or
        alternatively, performing weighted summation on the first deceleration of each of the plurality of vehicles to obtain a second deceleration; determining, if the second deceleration is greater than or equal to a predetermined maximum deceleration, the predetermined maximum deceleration as the target deceleration; determining, if the second deceleration is smaller than or equal to a predetermined minimum deceleration, the predetermined minimum deceleration as the target deceleration; and determining, if the second deceleration is greater than the predetermined minimum deceleration and smaller than the predetermined maximum deceleration, the second deceleration as the target deceleration, wherein the predetermined maximum deceleration is greater than the predetermined minimum deceleration.

4. An electronic device comprising a memory, the memory storing a computer program product and comprising a computer readable hardware storage device having a computer readable program code stored therein, said computer readable program code executable by a processor of a computer system to implement a method for vehicle control, the method comprising:

acquiring a target deceleration, if a vehicle is traveling on a road section, wherein for each vehicle of a plurality of vehicles, the target deceleration is determined by according to a plurality of history decelerations of each vehicle when traveling on the road section and triggering a braking energy recovery; and performing the braking energy recovery according to the target deceleration, if the vehicle receives a brake instruction and triggers the braking energy recovery, wherein the acquiring the target deceleration comprises:

for each vehicle of the plurality of vehicles, acquiring, from a server, the plurality of history decelerations of each vehicle when traveling on the road section and triggering the braking energy recovery, and determining the target deceleration according to the plurality of history decelerations, wherein the determining the target deceleration according to the plurality of history decelerations comprises:

for each of the plurality of vehicles, performing weighted summation on the plurality of historical decelerations to obtain a first deceleration of each of the plurality of vehicles; and performing weighted summation on the first deceleration of each of the plurality of vehicles to obtain the target deceleration; or alternatively, performing weighted summation on the first deceleration of each of the plurality of vehicles to obtain a second deceleration; determining, if the second deceleration is greater than or equal to a predetermined maximum deceleration, the predetermined maximum deceleration as the target deceleration; determining, if the second deceleration is smaller than or equal to a predetermined minimum deceleration, the predetermined minimum deceleration as the target deceleration; and determining, if the second deceleration is greater than the predetermined minimum deceleration and smaller than the predetermined maximum deceleration, the second deceleration as the target deceleration, wherein the predetermined maximum deceleration is greater than the predetermined minimum deceleration.

5. The electronic device of claim 4, wherein:

when performing the weighted summation on the plurality of historical decelerations, the closer a time when a historical deceleration occurs is to a current time, the greater a weight of the historical deceleration is; and when performing weighted summation on the first deceleration of each of the plurality of vehicles, the closer the time when a vehicle is traveling on the road section is to the current time, the greater the weight of the first deceleration of the vehicle is.

* * * * *